Patented Sept. 22, 1953

2,653,108

UNITED STATES PATENT OFFICE 2,653,108

CELLULOSE ETHER COMPOSITION

Norman Bruce Oakley, Wilmington, Del., assignor to Hercules Powder Company, Wilmington, Del., a corporation of Delaware No Drawing. Application December 29, 1950, Serial No. 203,529

2 Claims. (Cl. 106—189)

This invention relates to cellulose ether combinations; more particularly, it relates to carboxymethyl hydroxyethyl cellulose plasticized with dipropylene glycol.

The incorporation of plasticizers in films to promote flexibility and toughness is a well-known practice. In the case of water-soluble cellulose ethers, plasticizers are mandatory to insure flexibility and toughness under normal and especially under low humidity conditions. Water-soluble cellulose ethers are inherently quite brittle in the absence of moisture, water being the best plasticizer for them. Many materials have been employed as plasticizers in films of water-soluble cellulose ethers, and generally may be categorized as polyhydroxy compounds or nitrogenous derivatives. In the former class are glycerine and the various ethylene glycols, while the latter class includes such materials as urea, formamide, acetamide, and the various ethanol amines. All of these plasticizers suffer from one or more defects such as: being too hygroscopic (leading to excessive loss of tensile strength at high humidities, blocking, and a tacky "feel"—e. g., glycerine, triethanolamine, etc.); exerting too high a solvency effect on the film-former (causing excessive decrease in tensile strength—e. g., urea acetamide, triethanolamine, etc.); and toxicity preventing incorporation into possible foodstuff uses (nitrogenous derivatives are considered somewhat toxic and ethylene glycols are converted into insoluble oxalates which are retained by the body).

Now, in accordance with this invention, it has been found that dipropylene glycol when used as a plasticizer for carboxymethyl hydroxyethyl cellulose is not excessively hygroscopic, is a nonsolvent-type plasticizer, and is less toxic than even ethyl alcohol. Further, it was discovered that dipropylene glycol is unusual in that it is compatible with carboxymethyl hydroxyethyl cellulose of only a certain range of carboxymethyl substitution, and is entirely incompatible with carboxymethylcellulose.

The following examples will serve to illustrate the invention (all parts are parts by weight):

The following solutions were prepared and run through a 3-inch Premier colloid mill at a 2-mil setting.

Table 1

| Material | Examples | | | |
|---|---|---|---|---|
| | 1 | 2 | 3 | 4 |
| Carboxymethyl hydroxyethyl cellulose | 100 | 70 | 70 | 70 |
| Dipropylene glycol | | 30 | | |
| Glycerine | | | 30 | |
| Triethanolamine | | | | 30 |
| Percent total solids in solution | 7 | 10 | 10 | 10 |

The degree of substitution of carboxymethyl is 0.39 per anhydro-glucose unit, and of hydroxyethyl, 0.45 per anhydro-glucose unit. The viscosity of the carboxymethyl hydroxyethyl cellulose in 2% solution is 16 cps.

Films were cast of sufficient thickness to give 2.0-mil dry films. Five tensile strips (5 inches x ½ inch) were stored in desiccators containing saturated salt solutions at each humidity (i. e., 10% relative humidity using saturated $H_3PO_4$ and 90% using saturated $Na_2SO_4$) at 77° F. Another set of five strips was held in a constant humidity room maintained at 50% relative humidity and 77° F. Tensile strength and elongation were determined on a Scott IP-4 tensile tester after moisture equilibrium had been obtained. The following results were obtained:

Table 2

| Example | Percent Relative Humidity | Tensile Strength (p. s. i.) | Elongation (percent) |
|---|---|---|---|
| 1 | 10 | 15,000 | 5 |
| | 50 | 10,700 | 5 |
| | 90 | 3,300 | 14 |
| 2 | 10 | 9,000 | 6 |
| | 50 | 6,000 | 16 |
| | 90 | 2,500 | 52 |
| 3 | 10 | 5,000 | 13 |
| | 50 | 3,200 | 41 |
| | 90 | (1) | (1) |
| 4 | 10 | 5,900 | 6 |
| | 50 | 4,300 | 38 |
| | 90 | 1,340 | 81 |

[1] Too soft to handle.

Table 3

| | Examples | | |
|---|---|---|---|
| | 5 | 6 | 7 |
| Carboxymethyl hydroxyethyl cellulose | 80 | 80 | 60 |
| Glycerine | 20 | | |
| Dipropylene glycol | | 20 | 40 |
| Percent total solids in solution | 5 | 5 | 9.8 |

In the carboxymethyl hydroxyethyl cellulose, the degree of substitution of carboxymethyl is 0.42, and of hydroxyethyl, 0.25. The viscosity of the carboxymethyl hydroxyethyl cellulose in 2% solution is 51 cps.

The above solutions were prepared and centrifuged for one-half hour at 21,000 R. P. M. in a batch bowl of a Sharples air-driven laboratory supercentrifuge. Films of sufficient wet thickness were then cast to give dry films 2.0 mils thick.

Upon drying, the films were force-dried for 1 hour at 70° C. and then conditioned 48 hours at 50% relative humidity and 77° F. Five tensile strips measuring ½ inch by 5 inches were then cut from each film and tensile strength and elongation determined on a Scott IP-4 tensile machine. Likewise, five flex strips measuring 15 millimeters by 5 inches were prepared (except in Example 7 where, due to insufficient sample film, only two M. I. T. flex strips were prepared) and flexibility measured by an M. I. T. flexometer, using 200-gram tension during testing. Both tests were performed at 50% relative humidity and 77° F.

Table 4

|  | Examples | | |
| --- | --- | --- | --- |
|  | 5 | 6 | 7 |
| Tensile strength (p. s. i.) | 7,000 | 9,400 | 7,600 |
| Elongation (percent) | 8.0 | 7.0 | 8.0 |
| Flexibility (average double folds) | 2,080 | 1,760 | { 9,318 / 7,807 } |

Table 5

|  | Examples | | | | |
| --- | --- | --- | --- | --- | --- |
|  | 8 | 9 | 10 | 11 | 12 |
| Carboxymethyl hydroxyethyl cellulose | 50 | 60 | 65 | 70 | 75. |
| Dipropylene glycol | 50 | 40 | 35 | 30 | 25. |
| Percent total solids in solution | 10.4 | 8.8 | 8.1 | 7.7 | 7.1. |
| Film clarity | Slightly hazy. | Slightly hazy. | Clear. | Clear. | Clear. |

The above solutions (Table 5) were prepared and a film approximately one-mil thick (dry) cast from each solution. The films were dried at 65° C. The carboxymethyl hydroxyethyl cellulose had a degree of substitution for the carboxymethyl of 0.37 and for the hydroxyethyl of 0.34, while the viscosity of a 2% solution of the carboxymethyl hydroxyethyl cellulose was 21 centipoises. When dried at room temperature, Examples 8 and 9 exuded, while Example 10 exuded slightly and Examples 11 and 12 exuded very slightly. When the samples were wiped clean and further dried at 105° C. for 16 hours, there was no further exudation whatever.

Table 6

|  | Examples | | | | | |
| --- | --- | --- | --- | --- | --- | --- |
|  | 13 | 14 | 15 | 16 | 17 | 18 |
| Carboxymethyl degree of substitution | 0.43 | 0.50 | 0.502 | 0.51 | 0.52 | 0.57 |
| Hydroxyethyl degree of substitution | 0.33 | 0.11 | 0.36 | 0.32 | 0.165 | 0.38 |
| 2% Solution viscosity (centipoises) | 45 | 10,000 | 15 | 5 | 50 | 10 |
| Film compatibility | C | C | C | I | I | I |

A series of carboxymethyl hydroxyethyl celluloses of various degrees of substitution was obtained and compatibility with dipropylene glycol determined by preparing solutions containing 60 parts carboxymethyl hydroxyethyl cellulose to 40 parts of dipropylene glycol. The total solids of the solutions was 6.7%. Films were then cast of sufficient wet thickness to give a dry thickness of approximately 2 mils. The results appear in Table 6 with the designation "C" denoting compatibility and the designation "I" denoting incompatibility.

In Table 2 the effect of various relative humidities on film properties of carboxymethyl hydroxyethyl cellulose when plasticized with dipropylene glycol and when plasticized with glycerine and triethanolamine are compared. A very significant difference exists among the three films in that the tensile strength of the dipropylene glycol-plasticized film was not nearly so adversely affected at 90% relative humidity as was the triethanolamine- or the glycerine-plasticized films. Another important item is the fact that the triethanolamine- and the glycerine-plasticized films felt tacky and blocked at 90% relative humidity whereas no tendency towards tackiness or blocking existed in the dipropylene glycol-plasticized film.

Tables 3 and 4 exemplify the difference in physical properties obtained through the use of a solvent versus a nonsolvent type plasticizer. The tensile strength of the dipropylene glycol-plasticized film changed relatively slightly as the amount of plasticizer was doubled from 20% to 40%; but the tensile strength of the glycerine-plasticized film at 20% glycerine was even less than the tensile strength of the carboxymethyl hydroxyethyl cellulose film plasticized with twice that amount of dipropylene glycol.

While larger amounts of plasticizer are operable, Table 5 shows that with 40 per cent or more dipropylene glycol, exudation occurs. The amount of exudation depends to some extent on the drying temperature. A preferred maximum is 40 per cent dipropylene glycol, but more may be used. The minimum amount of dipropylene glycol is not at all critical and will depend on the properties which it is desired to impart to the film. In general, about 10% plasticizer is needed to obtain a plasticization sufficient for general use.

Dipropylene glycol can be used either alone or in conjunction with other plasticizers. Other additives such as dyes, ink, etc. may be added.

The use of dipropylene glycol with carboxymethyl hydroxyethyl cellulose permits the formation of tough, pliable films which are (1) not effected detrimentally over a range of humidities, (2) capable of retaining these properties at high plasticizer content, and (3) apparently edible. The uses to which such films could be put are very numerous, among them being the packaging of detergents in predetermined unit packages (carboxymethyl hydroxyethyl cellulose is a detergent aid); packaging of foodstuffs such as cocoa mix powders, dehydrated soups and vegetables, yeast, prepared flour mixes, etc.; packaging household and industrial dyes, starch, insecticide mixtures, weed killers, blueing, water-softeners, etc.; packaging such miscellaneous household items as razor blades, bar soap, hair set chemicals, sealing tapes for envelopes and bottles, medicines, labels for fruits and candies, toilet bowl cleaners, etc.; and other uses such as tapes of seeds. This list is far from exhaustive, and is merely indicative of the wide versatility of such a film including consumption of the film with its packaged contents in uses where the film composition contributes to the function of the contents or where consumption of the film with its packaged contents affords additional convenience.

What I claim and desire to protect by Letters Patent is:

1. A composition of matter comprising carboxymethyl hydroxyethyl cellulose having a degree of substitution from about 0.37 to not more than 0.5 carboxymethyl group per anhydroglucose unit and dipropylene glycol in an amount from 10% to 40% by weight as a plasticizer therefor.

2. A pellicle comprising carboxymethyl hydroxyethyl cellulose having a degree of substitution from about 0.37 to not more than 0.5 carboxymethyl group per anhydro-glucose unit and dipropylene glycol in an amount from 10% to 40% by weight as a plasticizer therefor.

NORMAN BRUCE OAKLEY.

References Cited in the file of this patent

UNITED STATES PATENTS

| Number | Name | Date |
|---|---|---|
| 2,135,128 | Thomas | Nov. 1, 1938 |
| 2,235,798 | Collings et al. | Mar. 18, 1941 |
| 2,265,918 | Lilienfeld | Dec. 9, 1941 |
| 2,465,915 | Myles | Mar. 29, 1949 |
| 2,476,331 | Swinehart et al. | July 19, 1949 |
| 2,550,622 | Taub | Apr. 24, 1951 |